(12) United States Patent
Alcaide Hernández et al.

(10) Patent No.: US 11,378,200 B2
(45) Date of Patent: Jul. 5, 2022

(54) ELECTROMAGNETICALLY OPERATED VALVE

(71) Applicant: Fico Transpar, S.A., Barcelona (ES)

(72) Inventors: Olallo Alcaide Hernández, Viladecavalls (ES); Jose Luis Villarubia Guarino, Viladecavalls (ES); Sergi Civil Paulí, Viladecavalls (ES)

(73) Assignee: FICO TRANSPAR, S.A., Barcelona (ES)

( * ) Notice: Subject to any disclaimer, the term of this patent is extended or adjusted under 35 U.S.C. 154(b) by 0 days.

(21) Appl. No.: 16/932,493

(22) Filed: Jul. 17, 2020

(65) Prior Publication Data

US 2021/0018112 A1 Jan. 21, 2021

(30) Foreign Application Priority Data

Jul. 19, 2019 (EP) .................................. 19382615

(51) Int. Cl.
*F16K 31/06* (2006.01)
*F16K 27/02* (2006.01)
(52) U.S. Cl.
CPC ........ *F16K 31/0651* (2013.01); *F16K 27/029* (2013.01); *F16K 31/0658* (2013.01)
(58) Field of Classification Search
CPC . F16K 27/029; F16K 31/0651; F16K 31/0658
See application file for complete search history.

(56) References Cited

U.S. PATENT DOCUMENTS

| | | | | |
|---|---|---|---|---|
| 4,575,009 A | * | 3/1986 | Giraudi | F02M 51/08 239/585.4 |
| 5,086,743 A | * | 2/1992 | Hickey | F02D 41/3005 123/456 |
| 5,458,294 A | * | 10/1995 | Zachary | F23N 1/005 239/585.5 |
| 6,896,199 B2 | * | 5/2005 | Bissonnette | B60S 1/481 239/128 |
| 9,217,511 B2 | * | 12/2015 | Williams | F16K 31/52408 |
| 9,772,630 B2 | * | 9/2017 | Yang | G05D 9/12 |
| 10,161,526 B2 | | 12/2018 | Na et al. | |

FOREIGN PATENT DOCUMENTS

GB 830394 A 3/1960

\* cited by examiner

*Primary Examiner* — Eric Keasel
(74) *Attorney, Agent, or Firm* — Cantor Colburn LLP

(57) ABSTRACT

The electromagnetically operated valve includes a valve body, a plunger member, electromagnetic driving means for driving the plunger member along a flow direction inside the valve body into at least an open position in which a fluid is allowed to flow through the valve body and into a closed position in which the fluid is not, wherein the plunger member is arranged to be forced by a pressure of flowing fluid into the closed position, and to be driven by the electromagnetic driving means into the open position.

10 Claims, 3 Drawing Sheets

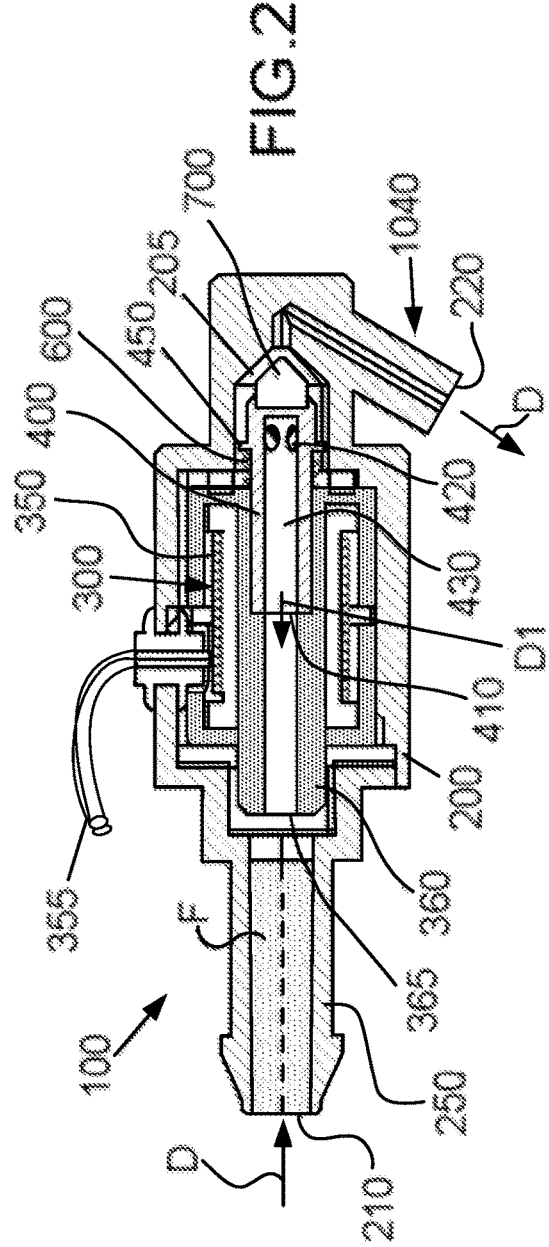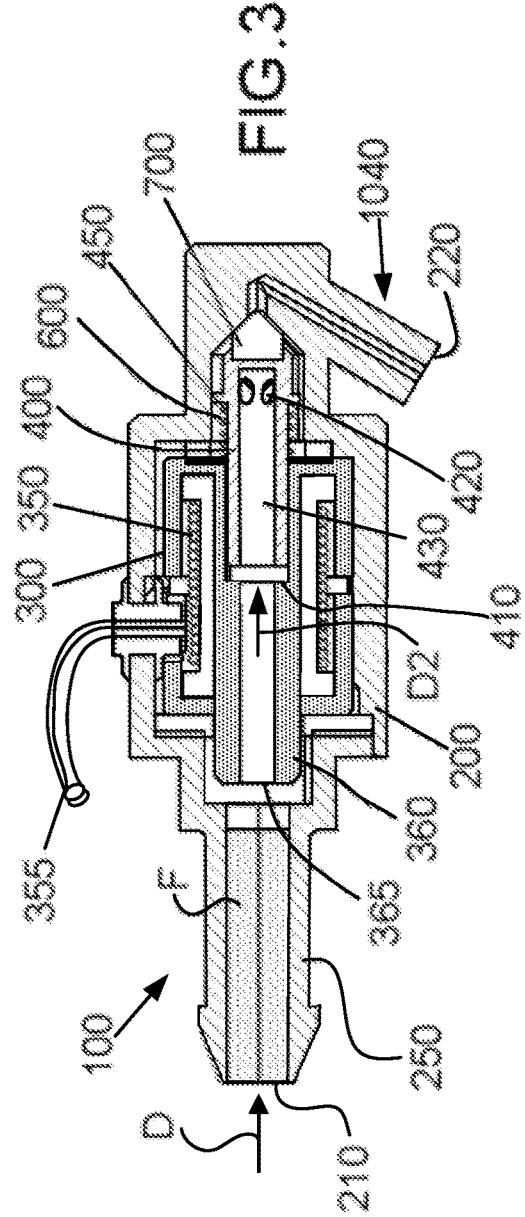

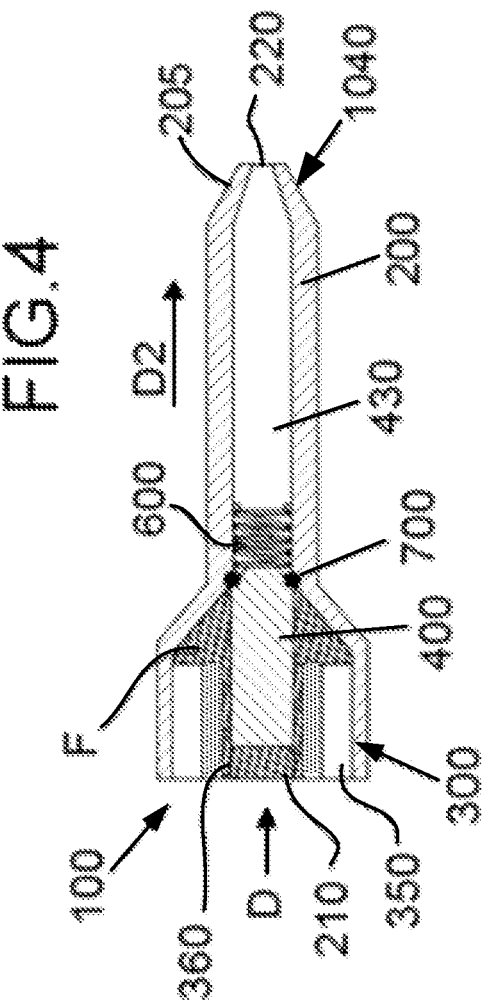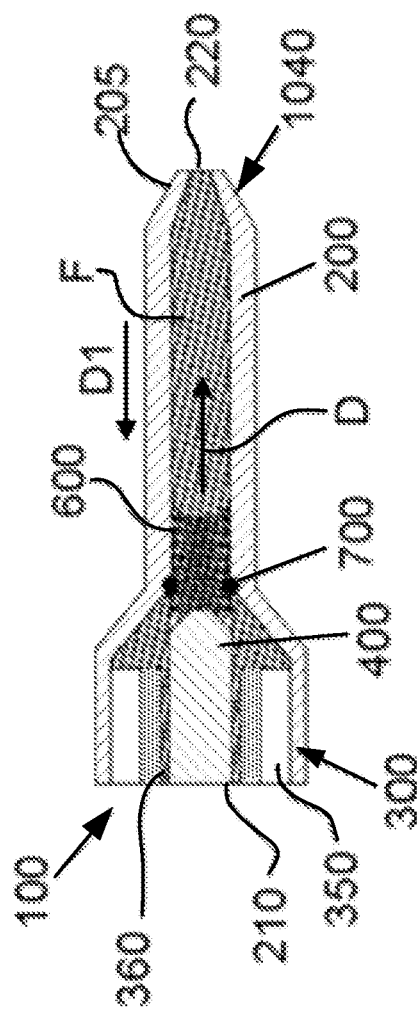

ELECTROMAGNETICALLY OPERATED VALVE

CROSS-REFERENCE TO RELATED APPLICATIONS

This application claims the benefit of European Application Serial No. 19382615.3 filed Jul. 19, 2019, the disclosure of which is incorporated herein by reference in its entirety.

BACKGROUND

The present disclosure refers to flow regulation and in particular to electromagnetically operated valves including a valve body and electromagnetic driving means for driving a plunger member along a flow direction for regulating a flow of fluid. The present disclosure also refers to fluid ejection systems comprising said electromagnetically operated valves.

Electromagnetic operated valves are widely known in the art comprising a valve body, electromagnetic driving means, and a plunger member movable by said driving means along a flow direction to operate a closure member relative to a valve seat against pressure of a fluid to enable flow of fluid.

A known electromagnetically operated valve includes an upper valve member loaded by a spring and controlling communication between an air inlet port, connected to a source of compressed air, and an engine port connected to a door engine, and a lower valve member controlling communication between the engine port and an exhaust port and a solenoid secured to the valve. A solenoid plunger is provided to move upwards and downwards to open an air inlet valve and to close an exhaust valve.

A known mechanical valve controls coolant flow, and may be opened and closed by the pressure of a coolant introduced into a coolant inlet. The valve comprises a valve housing having a coolant inlet and a coolant outlet, a valve body in the coolant flow space linearly movable by the flow pressure of the coolant introduced into the coolant inlet, and configured to move by the flow pressure of the coolant to close the coolant outlet, and a support spring disposed at the rear of the valve body in the coolant flow space to elastically support the valve body. A support spring is fitted in a coolant flow space formed in the valve housing.

One drawback of such valves is that the fluid may cause an unauthorized opening of the valve.

SUMMARY

An electromagnetically operated valve is provided including a valve body, a plunger member and electromagnetic driving means for driving the plunger member along a flow direction inside the valve body. The electromagnetic driving means are suitable for driving the plunger member into at least an open position in which a fluid such as water and/or compressed air, e.g. compressed to a pressure of 3-8 bar, is allowed to flow through the valve body and into a closed position in which the fluid is not.

In the present electromagnetically operated valve, the plunger member is arranged to be forced by a pressure of flowing fluid into the closed position, and to be driven by the electromagnetic driving means into the open position.

The electromagnetic driving means may be any electromagnetic device suitable for driving the plunger member along a flow direction inside the valve body such as, for example, one comprising a coil arranged surrounding a ferromagnetic ring which in turn is arranged surrounding the plunger member for generating an electromagnetic field suitable for driving the plunger member. The electromagnetic driving means may be configured in any case for adjusting an electromagnetic force applied to the plunger member depending on a pressure of flowing fluid entering the valve body.

In one preferred example of the present electromagnetically operated valve, the plunger member may be at least partially hollow having at least one plunger member fluid inlet and at least one plunger member fluid outlet for the passage of fluid there through. The plunger member may be however solid or fully hollow, that is, having a through hole or channel. The plunger member may have for example a dimension selected from one or more of 2-8 mm in diameter and 5-10 mm in length.

Advantageously, a closing spring may be provided inside the valve body to bias the plunger member along the same direction as that of the fluid flow direction for ensuring that the plunger member is in a closed position in which fluid is not allowed to flow through the valve body in the event that there is no enough pressure for this.

Alternatively, an opening spring may be also provided inside the valve body to bias the plunger member against the pressure of flowing fluid. Said opening spring may be a preloaded compression spring with a load similar to but less than the pressure of the incoming fluid flow so the magnetic force required to open the fluid duct is reduced.

Guide rails may be included suitable for guiding the plunger member as it is driven inside the valve body along the flow direction.

A fluid ejection system is also disclosed herein. The fluid ejection system comprises a fluid duct inside of which a fluid can flow. The fluid duct has a duct fluid inlet for receiving fluid from a fluid source, a fluid outlet for discharging the fluid to the outside, and at least one electromagnetically operated valve as described above for regulating the flow of the fluid through the fluid duct. It is envisaged that the fluid ejection system comprises a number of fluid ducts as required fed by at least one fluid source and arranged to discharge a number of corresponding fluid streams. A nozzle may be arranged in each duct fluid outlet for suitably ejecting the fluid. In this respect, it is advantageous if the above described electromagnetically operated valves are included in the nozzles forming electromagnetically operated valve devices. Thus, a number of electromagnetically operated valve devices may be included in the fluid ejection system. Means for controlling the electromagnetically operated valve may be included.

The electromagnetically operated valve may be supplied as a valve kit as an independent element capable of being fitted into any circuit section before the fluid ejection.

According to one alternative aspect of the present disclosure, a fluid ejection system suitable for cleaning applications, such as for cleaning optical surfaces in motor vehicles, is also disclosed herein comprising at least one fluid duct inside of which a fluid can flow, said at least one fluid duct each having a duct fluid inlet for receiving fluid from a fluid source, a duct fluid outlet for discharging the fluid to the outside, and at least one electromagnetically operated valve for regulating the flow of the fluid through the fluid duct. In this alternative aspect, such electromagnetically operated valve may be, for example, a standard solenoid valve.

With the above described electromagnetically operated valve and fluid ejection system, fluid flow through a fluid duct is efficiently managed by allowing the fluid to flow by operating an electromagnetic driving means and preventing the fluid from flowing by fluid pressure while pressure in a fluid source is maintained.

A significant advantage of the present electromagnetically operated valve and fluid ejection system is that fluid flow opening and closing functions may be integrated in nozzles as a result of which no solenoid valve manifold and thus less supplier dependence is required. It has been found that, with the above described electromagnetically operated valve and fluid ejection system cleaning times and cleaning fluid volume are advantageously reduced. For example, fluid consumption may be reduced by 20% and fluid tank volume may be also reduced by 20%. A further significant advantage of the present electromagnetically operated valve and fluid ejection system is that all conduits are pressurized until reaching nozzles ensuring efficient fluid delivery. With the present the present fluid ejection device, check valves, pressure valves, or non-spill valves which are typically used in prior art fluid ejection devices may be dispensed with, in particular when liquid is used as fluid.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 2 is an elevational cutaway view of an electromagnetically operated device of the fluid ejection system shown in an open position;

FIG. 3 is an elevational cutaway view of the electromagnetically operated device shown in a closed position;

FIG. 4 is an elevational cutaway view of a second embodiment of the electromagnetically operated device shown in an open position; and FIG. 5 is an elevational cutaway view of the electromagnetically operated device in FIG. 4 but shown in a closed position.

DETAILED DESCRIPTION

Figure 1:
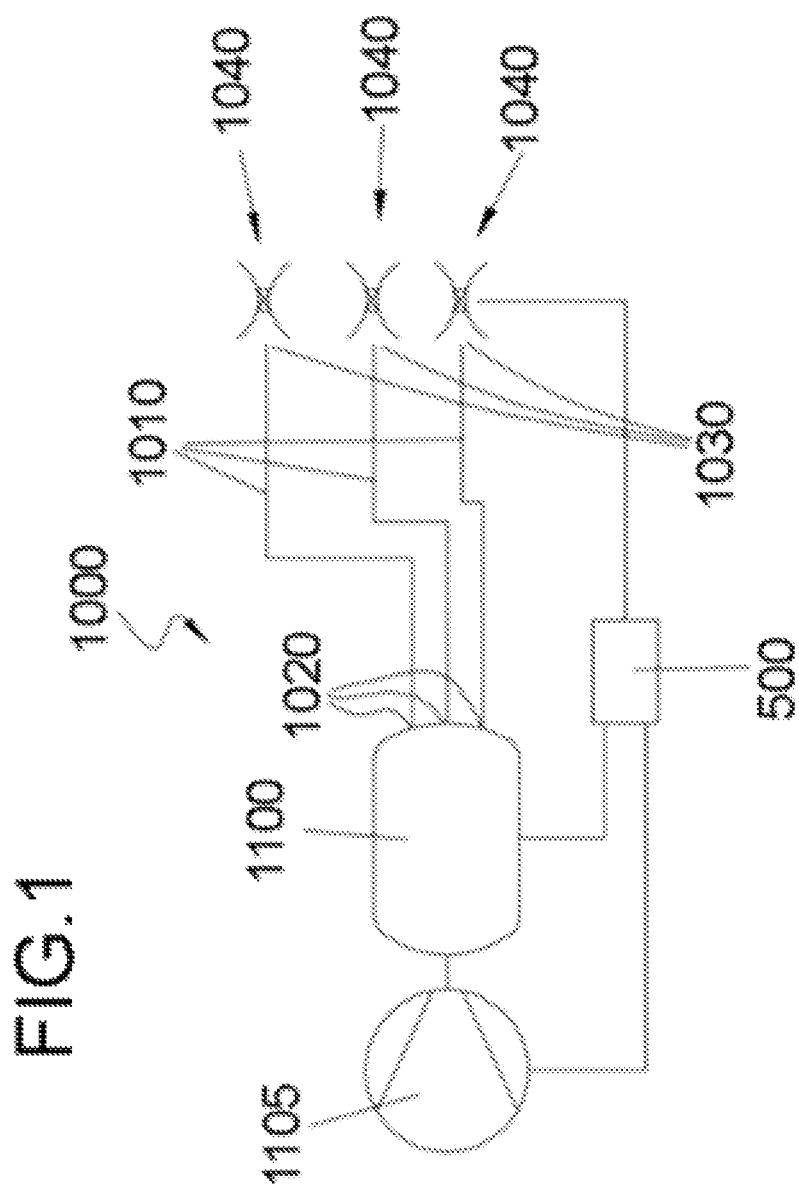
FIG. 1 is a diagram of the present fluid ejection system.

FIG. 1 shows a diagram illustrating one exemplary layout of a fluid ejection system 1000. The fluid ejection system 1000 in the example shown comprises a number of fluid ducts 1010 through which pressurized fluid F can flow. One example to which the present fluid ejection system 1000 may be applied is devices for cleaning optical surfaces in motor vehicles being the fluid F air or washing liquid. Other different applications and fluids are not ruled out.

Fluid ducts 1010 each having one duct inlet 1020 and one duct outlet 1030 are provided for receiving fluid F from a source 1100 of pressurized fluid F, i.e. a compressed-fluid tank or directly from a fluid compressor. The compressed-fluid tank 1100 containing fluid F, such as air, under a pressure of about 3-8 bar from the fluid compressor 1105. Although one source of pressurized fluid 1100 has been illustrated in FIG. 1, a number of sources of pressurized fluid 1100 may be provided for feeding one or more fluid ducts 1010.

The duct outlet 1030 is arranged at one free end of each air duct 1010 for discharging fluid F to the outside through a nozzle 1040. Fluid pressure at the duct inlet 1020 is of the order of 1-10 bar. Fluid ducts 1010 are thus all pressurized until reaching nozzles 1040. The electromagnetically operated valves 100 shown in FIGS. 2 and 3 of the drawings are included in the nozzles 1040 forming electromagnetically operated valve devices.

A control means 500 is also provided for controlling a state of an electromagnetically operated valve 100 that serves the purpose of regulating fluid flow through fluid ducts 1010.

The above mentioned control means 500 may be any intelligent control means such as an electronic control unit (ECU), as shown in FIG. 1, for controlling a status of the electromagnetically operated valves 100 in response to one or more sensing elements such as a dirt sensor, etc. However, the control means 500 may be a manual actuator to control the operation of the electromagnetically operated valve 100 as desired by the user or operator.

Now referring to FIGS. 2 and 3 of the drawings, a first example of the electromagnetically operated valve 100 is shown comprising a valve body 200 having a valve inlet 210 leading to an inlet section 250 and a valve outlet 220 leading to a corresponding nozzle 1040, shown in FIG. 1. A mobile core or plunger member 400 movable through the inside of the valve body 200 is also provided. In the example shown, the plunger member 400 has a diameter of and about 2-8 mm and is 5-10 mm long. Other sizes are of course possible.

The plunger member 400 is driven by electromagnetic driving means 300 along a flow direction D inside the valve body 200 along an open direction D1 to the left in FIG. 2 opposed to the fluid flow, as it will be explained below. As stated above, nozzles 1040 are provided in respective valve body outlets 220.

Still referring to FIGS. 2 and 3 of the drawings, the electromagnetic driving means 300 in the example shown comprises a coil 350 that is arranged surrounding a fixed core or ferromagnetic ring 360. The ferromagnetic ring 360 is in turn arranged surrounding the plunger member 400. The ferromagnetic ring 360 has a ring inlet 365 fluidly connected to the valve inlet 210. As the coil 350 is energized through power supply line 355 an electromagnetic field is generated. Such electromagnetic field is suitable for causing a magnetic force, for example of the order of 5-25 N, greater than that of the fluid F, to drive the plunger member 400 along the open direction D1 to the left in FIG. 2 as described above, along flow direction D, in the opposite direction to that of the fluid flow. This causes the plunger member 400 to move into an open position shown in FIG. 2 in which fluid F is allowed to flow through the valve body 200 into the valve outlet 220. As the coil 350 is not energized, the electromagnetic field ceases and the plunger member 400 is driven by the pressure of fluid F that flows inside the valve body 200 along the closed direction D2, to the right in FIG. 3 as a result of which fluid F is prevented from flowing into the valve outlet 220. The plunger member 400 may be partially hollow with an inner channel 430 defined therein.

A plunger member fluid inlet 410 is fluidly connected to said ring inlet 365 and a number of plunger member fluid outlets 420 radially distributed are provided in the plunger member 400. Fluid F may be thus allowed to flow from the plunger member fluid inlet 410 to the plunger member fluid outlets 420 along flow direction D towards valve outlet 220 to be delivered through nozzles 1040.

In a second example, the plunger member 400 is solid as shown in FIGS. 4 and 5 of the drawings. In use, in said second example, since the plunger member 400 is solid, the fluid F flows around the plunger member 400 and even may flow around the ferromagnetic ring 360. As in the first example, with the coil 350 not being energized, the plunger member 400 is driven by the pressure of fluid F that flows inside the valve body 200 along the closed direction D2, to the right in figure, as a result of which fluid F is prevented from flowing into the valve outlet 220, and with the coil 350 being energized, the plunger member 400 is driven by the generated magnetic field along the open direction D1, to the left in figure, as a result of which fluid F is allowed to flow around the plunger member 400 and it may be also allowed to flow around the ferromagnetic ring 360 into the valve outlet 220 to be ejected out through nozzle 1040.

A leak-proof sealing cap 700 is provided to close the valve body 200. Thus, in the open position of the electromagnetically operated valve 100 shown in FIG. 2, the sealing cap 700 is separated from one end 205 of the interior of the valve body 200 allowing fluid F to flow towards the valve outlet 220. In the closed position of the electromagnetically operated valve 100 shown in FIG. 3, the sealing cap 700 abuts said end 205 of the interior of the valve body 200 preventing fluid F from flowing towards the valve outlet 220.

In FIGS. 2 and 3, a preloaded compression closing spring 600 is provided inside the valve body 200 to bias the plunger member 400. Specifically, the closing spring 600 is arranged surrounding the plunger element 400 and more particularly the closing spring 600 is arranged between the ferromagnetic ring 360 and ribs 450 formed in the plunger member 400. The closing spring 600 is capable of providing a spring force of about 1-10 N in the same direction as the pressure of fluid F flowing inside the valve body 200. The force that can be applied by the coil 350 when energized is thus greater than the force of the closing spring 600 plus the force of the fluid F flowing through the valve body 200. In operation, the closing spring 600 is more extended in the closed position than in the open position biasing the plunger member 400 along the same direction D1 as that of the fluid flow direction D to keep the plunger member 400 in a closed position, shown in FIG. 3, even when not enough or no incoming fluid pressure exists.

An opening spring 600', shown in FIGS. 4 and 5, may be alternatively provided inside the valve body 200 to bias the plunger member 400 along a direction D1 opposite to that of the fluid flow direction D to counteract the force of the pressurized fluid F flowing through the valve body 200. As a result, high forces are not required to be applied to open the valve body end 205. Said opening spring 600' is more extended in the open position than in the closed position. Biasing force of said opening spring 600' is lower than a fluid pressure such that the plunger member 400 is always kept in a closed position by pressurized fluid. In particular, the force that can be applied by the coil 350 when energized is thus greater than the force of the fluid F flowing through the valve body 200 minus the force of the opening spring 600'.

As a result, a magnetic force required to drive the plunger member 400 along the open direction D1 is reduced.

The plunger member 400 is guided as it is driven inside the valve body 200 along flow direction D according to open and closed directions D1, D2 through the use of the above mentioned ribs 450 formed in the plunger member 400. Also, the plunger member 400 is guided in use through an inner surface of the ferromagnetic ring 360 and an exterior surface of the plunger member 400 itself as shown in FIG. 3 such that the plunger member 400 is centered inside the valve body 200 during use.

Although only a number of examples have been disclosed herein, other alternatives, modifications, uses and/or equivalents thereof are possible. For example, the coil 350 of the electromagnetic driving means 300 may be located outside the valve body 200, surrounding it. This may result in a more compact electromagnetically operated valve 100. All possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim and shall not be construed as limiting the scope of the claim.

While the present disclosure is described with reference to exemplary embodiments, it will be understood by those skilled in the art that various changes may be made and equivalents may be substituted without departing from the spirit and scope of the present disclosure. For example, the coil 350 of the electromagnetic driving means 300 may be located outside the valve body 200, surrounding it. This may result in a more compact electromagnetically operated valve 100. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

The invention claimed is:

1. An electromagnetically operated valve comprising:
    a valve body;
    a plunger member disposed inside the valve body, and adapted to move between an open position to facilitate fluid flow through the valve body and a closed position to prevent fluid flow through the valve body;
    an opening spring arranged inside the valve body that produces a spring force that biases the plunger member toward the open position and against a fluid force produced by a pressure of the fluid; and
    an electromagnetic driving means adapted to drive the plunger member toward the open position wherein the plunger member is arranged to be forced by a pressure of flowing fluid into the closed position, wherein the electromagnetic driving means includes a ferromagnetic ring and a coil surrounding the ferromagnetic ring which in turn is arranged surrounding the plunger member for generating an electromagnetic field causing a magnetic force suitable for biasing the plunger member toward the open position, and wherein the magnetic force plus the spring force is greater than the fluid force.

2. The electromagnetically operated valve of claim 1, wherein the plunger member is at least partially hollow having at least one plunger member fluid inlet and at least one plunger member fluid outlet for the passage of the fluid there through.

3. The electromagnetically operated valve of claim 1, wherein the plunger member includes a rib adapted to guide the plunger member as the plunger member is driven inside the valve body.

4. The electromagnetically operated valve of claim 1, wherein the fluid is compressed air.

5. The electromagnetically operated valve of claim 1, wherein the fluid is compressed to a pressure of 3-8 bar.

6. The electromagnetically operated valve of claim 1, wherein the plunger member has a dimension selected from one or more of 2-8 mm in diameter and 5-10 mm in length.

7. A fluid ejection system comprising:
    a fluid duct adapted to flow a fluid, the fluid duct having a duct inlet for receiving the fluid from a fluid source, and a duct outlet for discharging the fluid to the outside;

an electromagnetically operated valve adapted to regulate the flow of the fluid through the fluid duct, the electromagnetically operated valve including;

a valve body, a plunger member disposed inside the valve body, and adapted to move between an open position to facilitate fluid flow through the valve body and a closed position to prevent fluid flow through the valve body, an opening spring arranged inside the valve body that produces a spring force that biases the plunger member toward the open position and against a fluid force produced by a pressure of the fluid, and an electromagnetic driving means adapted to drive the plunger member toward the open position, wherein the plunger member is arranged to be forced by a pressure of flowing fluid into the closed position, wherein the electromagnetic driving means includes a ferromagnetic ring and a coil surrounding the ferromagnetic ring which in turn is arranged surrounding the plunger member for generating an electromagnetic field causing a magnetic force suitable for biasing the plunger member toward the open position, and wherein the magnetic force plus the spring force is greater than the fluid force; and an electronic control means configured to control electric power supplied to the electromagnetic driving means, wherein the amount of electric power supplied is based at least in-part on fluid pressure.

8. The fluid ejection system of claim 7, further comprising a plurality of fluid ducts fed by at least one fluid source and arranged to discharge a plurality of corresponding fluid streams, wherein the fluid duct is one of the plurality of fluid ducts.

9. The fluid ejection system of claim 7, wherein a nozzle is arranged at the duct outlet for ejecting the fluid.

10. The fluid ejection system of claim 9, wherein the nozzle is provided with the electromagnetically operated valve.

* * * * *